US011911826B2

(12) United States Patent
Chen et al.

(10) Patent No.: US 11,911,826 B2
(45) Date of Patent: Feb. 27, 2024

(54) PREPARATION OF TITANIUM AND TITANIUM ALLOY POWDER FOR 3D PRINTING BASED ON FLUIDIZED BED JET MILLING TECHNIQUE

(71) Applicant: UNIVERSITY OF SCIENCE AND TECHNOLOGY BEIJING, Beijing (CN)

(72) Inventors: Gang Chen, Beijing (CN); Mingli Qin, Beijing (CN); Qiying Tao, Beijing (CN); Xuanhui Qu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 496 days.

(21) Appl. No.: 17/200,475

(22) Filed: Mar. 12, 2021

(65) Prior Publication Data
US 2021/0197264 A1 Jul. 1, 2021

Related U.S. Application Data

(63) Continuation-in-part of application No. PCT/CN2019/123904, filed on Dec. 9, 2019.

(30) Foreign Application Priority Data

Apr. 16, 2019 (CN) .......................... 201910305528.2

(51) Int. Cl.
*B22F 9/04* (2006.01)
*B33Y 70/00* (2020.01)
(Continued)

(52) U.S. Cl.
CPC ..................... *B22F 9/04* (2013.01);
*B01J 2/16* (2013.01); *B22F 1/052* (2022.01);
*B33Y 70/00* (2014.12);
(Continued)

(58) Field of Classification Search
None
See application file for complete search history.

(56) References Cited

U.S. PATENT DOCUMENTS

2010/0255998 A1* 10/2010 Buta .................. C22C 1/00
427/196
2016/0221084 A1 8/2016 Klecka et al.

FOREIGN PATENT DOCUMENTS

CN 2242730 Y 12/1996
CN 2899949 Y 5/2007
(Continued)

OTHER PUBLICATIONS

English translation of CN 103433500-A (originally published Dec. 11, 2013), obtained from PE2E search.*
(Continued)

*Primary Examiner* — George Wyszomierski
(74) *Attorney, Agent, or Firm* — NKL Law; Allen Xue

(57) ABSTRACT

A method of preparation of titanium and titanium alloy powder for 3D printing is based on a fluidized bed jet milling technique. Hydride-dehydrite titanium powder and titanium alloy powder are used as main raw material powder, jet milling and shaping are carried out in shielding atmosphere of nitrogen or argon, and finally high-performance titanium and titanium alloy powder meeting the requirements of 3D printing process is obtained. The titanium and titanium alloy powder prepared using this method has a narrow particle size distribution, approximately spherical shape, and controllable oxygen content.

4 Claims, 3 Drawing Sheets

(51) Int. Cl.
*B01J 2/16* (2006.01)
*B22F 1/052* (2022.01)
(52) U.S. Cl.
CPC ..... *B22F 2009/044* (2013.01); *B22F 2201/02* (2013.01); *B22F 2201/11* (2013.01); *B22F 2202/15* (2013.01); *B22F 2301/205* (2013.01)

(56) References Cited

FOREIGN PATENT DOCUMENTS

| | | | |
|---|---|---|---|
| CN | 103433500 A | | 12/2013 |
| CN | 104525956 A | | 4/2015 |
| CN | 105499589 A | | 4/2016 |
| CN | 109382511 A | | 2/2019 |
| CN | 208526909 U | | 2/2019 |
| CN | 109877329 A | | 6/2019 |
| CN | 110961619 A | * | 4/2020 |
| JP | H02263901 A | | 10/1990 |

OTHER PUBLICATIONS

English translation of CN 208526909-U (originally published Feb. 22, 2019), obtained from PE2E search.*
English translation of CN 110961619-A (originally published Apr. 7, 2020), obtained from PE2E search.*

* cited by examiner

PREPARATION OF TITANIUM AND TITANIUM ALLOY POWDER FOR 3D PRINTING BASED ON FLUIDIZED BED JET MILLING TECHNIQUE

TECHNICAL FIELD

The present disclosure belongs to the technical field of metal powder metallurgy preparation, and relates to a jet-milling shaping technique for preparation of low-cost titanium and titanium alloy powder for 3D printing.

BACKGROUND ART

Titanium has the advantages of low density, excellent corrosion resistance property, high specific strength and outstanding biocompatibility, etc., and is widely applied in high-tech fields such as aeronautic and astronautic industry, biomedical industry, petrochemical industry, and energy and power industry, etc. Presently, the preparation of high-performance titanium products in complex shapes through near net forming processes in powder metallurgy such as 3D printing and injection molding has attracted great attention at home and abroad. In view of the technical requirements of the processes, the powder required for 3D printing technology shall have the characteristics of excellent fluidity, low oxygen content and high loose density. Among them, excellent fluidity of the powder is the key factor to ensure stable operation of the process, uniform spreading of the powder or uniform filling of the feed material in injection molding, and high product quality. Therefore, spherical titanium powder has become the main raw material for 3D printing technology. Hence, powder metallurgy processes such as 3D printing and injection molding usually use spherical titanium powder with excellent powder fluidity as the raw material. At present, spherical titanium powder is mainly prepared by inert gas atomization, plasma rotary electrode atomization or plasma fuse atomization, etc. The spherical titanium powder prepared through these processes can meet the technical requirements of 3D printing and injection molding. However, spherical titanium powder in fine particle size (<45 μm) prepared with the above techniques is extremely expensive, at a price higher than 2,000 yuan/kg. The main reasons are: the yield of fine titanium powder is generally low, and the cost of the milling equipment is high. Moreover, after decades of development of the above preparation techniques, the yield of fine powder is close to the limit, and it is difficult to realize stable production of spherical titanium powder at a low cost. That problem has become the principal problem restricting the development of the titanium industry for 3D printing in the world. Therefore, it is extremely urgent to develop a technique for preparation or processing of titanium and titanium alloy powder, which has low cost, employs a simple process, achieves controllable impurity content and excellent powder fluidity, and can meet the requirements of powder metallurgy processes such as 3D printing and injection molding.

CONTENTS OF THE INVENTION

The object of the present disclosure is to provide a method for preparation of titanium and titanium alloy powder for 3D printing based on a fluidized bed jet milling technique, so as to prepare high-performance titanium and titanium alloy powder through a short process at low cost, to meet the technical requirements of processes such as 3D printing, injection molding, and thermal spraying, etc. The technical scheme is as follows:

The method for preparation of titanium and titanium alloy powder for 3D printing in the present disclosure comprises the following steps:

step 1): weighing a certain amount of hydride-dehydride titanium powder or titanium alloy powder, which has 1,000-2,000 PPM oxygen content and is in particle size of 200-800 meshes and irregular morphology;

step 2): loading the titanium and titanium alloy powder in a fluidized bed jet grinding chamber, wherein three nozzles in communication with an air source are arranged above the fluidized bed jet grinding chamber at 60°-90° included angle between the nozzles and the wall surface of the grinding chamber;

step 3): placing the powder in the grinding chamber of a fluidized bed jet mill, charging high-purity nitrogen or high-purity argon as a grinding gas into the grinding chamber through a gas inlet, adjusting a grinding gas pressure in the fluidized bed jet mill to 0.1-10 MPa, and jetting titanium and titanium alloy powder from a powder outlet; adjusting the frequency of the classifier wheel to 0-60 Hz/min and adjusting the grinding time to 2-60 min.

Wherein, the titanium alloy powder in the step 1) comprises at least one of TC1, TC2, TC3 and TC4, and has 1,000-2,000 PPM oxygen content and is in particle size of 200-500 meshes.

Wherein, in the step 2), the three nozzles of the fluidized bed jet mill form a 120° included angle with each other, and employ supersonic nozzles, sonic nozzles or subsonic nozzles.

Wherein, in the step 3), the gas inlet is at a negative pressure, and the powder outlet is shielded by high-purity nitrogen or high-purity argon.

Wherein, the frequency of the classifier wheel in the step 3) is 60 Hz during material feeding and is adjusted to 0 Hz during material discharging.

Compared with the prior art, the present disclosure has the following prominent advantages:

The production efficiency is higher, the energy consumption is lower, and the cost is greatly reduced when compared with the traditional preparation processes of spherical titanium powder; the degree of contamination of the raw material powder is decreased and there is nearly no equipment wear by utilizing a fluidized bed jet mill; the increase of oxygen content in the titanium and titanium alloy powder is effectively controlled by utilizing an inert gas as the preparation and shielding gas; the prepared titanium and titanium alloy powder has the advantages of narrow particle size distribution, approximately spherical shape, controllable oxygen content, and excellent fluidity, etc.

EMBODIMENTS

Figure 1:
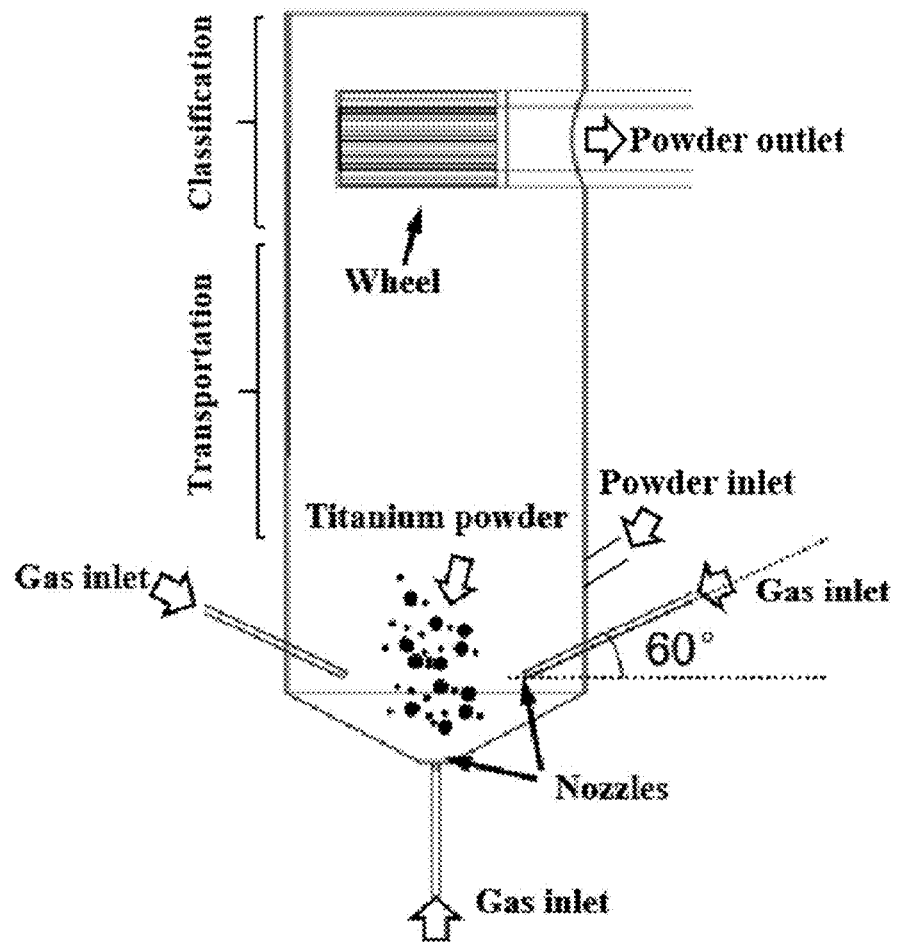
FIG. 1 is a schematic diagram of jet milling.

The schematic diagram of jet milling is shown in FIG. 1. It consists of a powder inlet, a powder outlet, three gas inlets, a stationary solid chamber wall, and a built-in moving classifier in the mill. Pressurized nitrogen is injected into the gas grinding chamber through three Laval nozzles with a diameter of 3 mm. Particles are introduced into the classifying region by the lower nozzle. As compared with fine particles, the centrifugal force is greater than the resistance for coarse powders. Thus, after colliding with the wall, coarse particles fall back to the grinding chamber to participate in further grinding. Meanwhile, the resistance becomes the dominant force in the case of fine particles, which are pulled to the central outlet to finally achieve powder classification.

Embodiment 1

Figure 2:
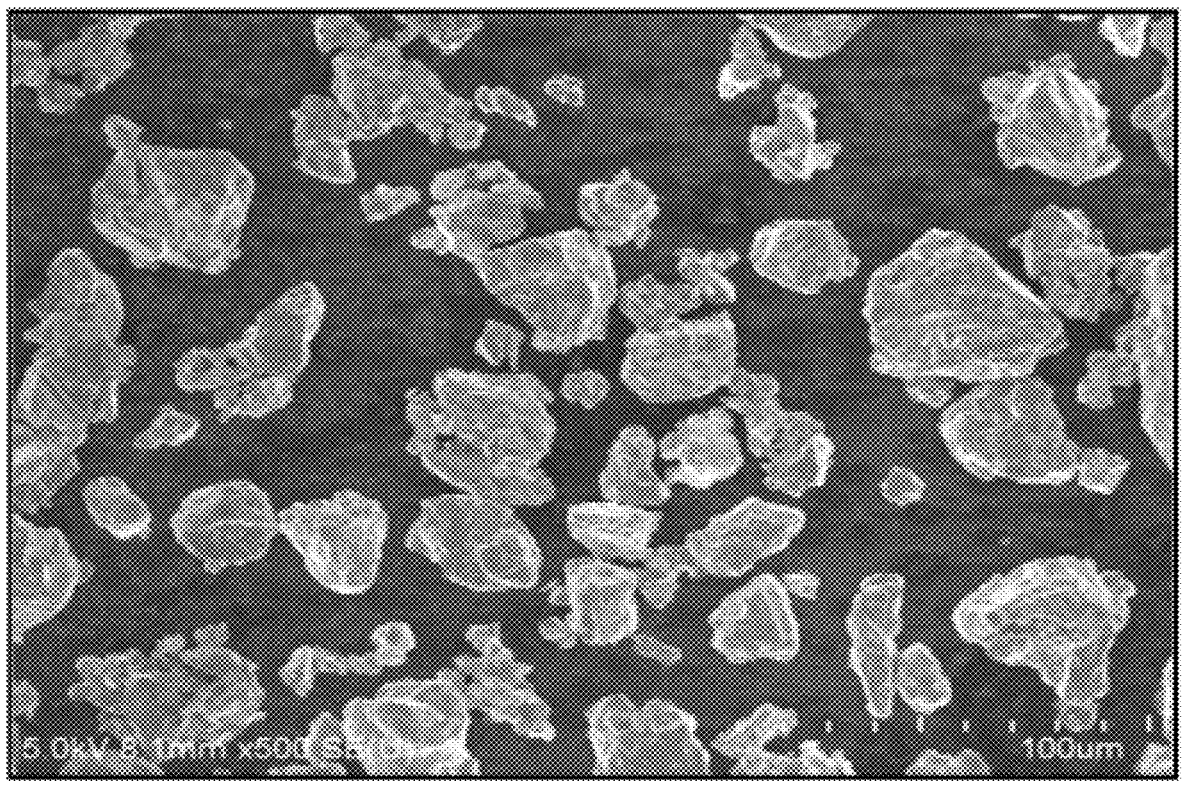
FIG. 2 is an SEM image of raw material powder.
Figure 3:
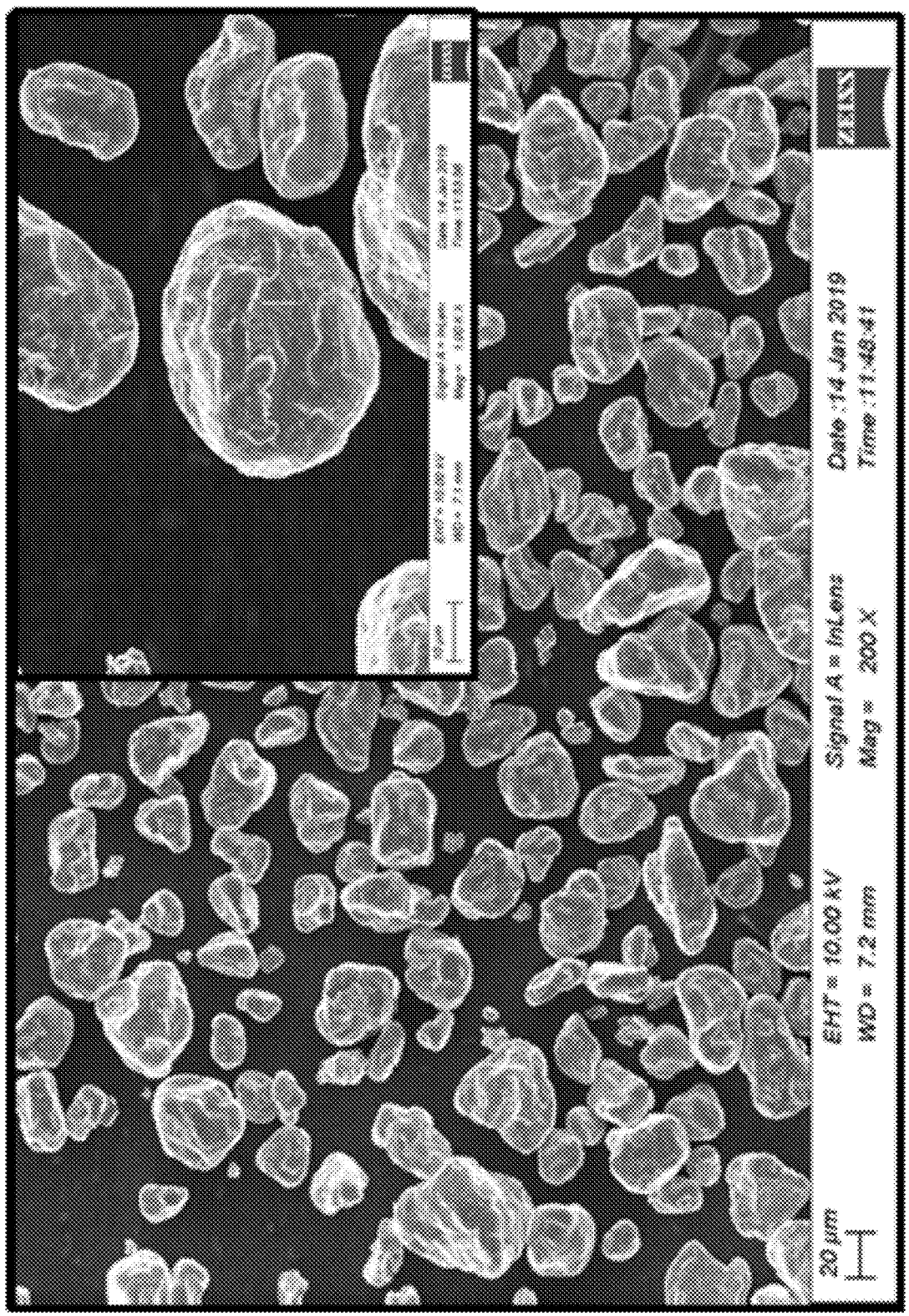
FIG. 3 is a photograph of approximately spherical titanium and titanium alloy powder prepared by the present disclosure for 3D printing.

When the titanium powder in the present disclosure is used, the oxygen content of the hydride-dehydride titanium powder in irregular morphology is 1,200 PPM, the mass is 400 g, the particle size is 325 meshes or smaller, the included angle between the nozzles of the fluidized bed jet mill and the wall of the grinding chamber is 60°, high-purity nitrogen is used as the grinding gas, the grinding gas pressure is 0.6 MPa, the frequency of the classifier wheel is 60 Hz during material feeding and 0 Hz during material discharging, and the grinding time is 6 min. The morphology of the titanium powder is irregular before the processing, as shown in FIG. 2, and is approximately spherical after the jet milling, as shown in FIG. 3, thus the sphericity is improved, the surface smoothness is higher, the fluidity is 35 s/50 g, and the oxygen content is 1,400 PPM.

The entire process in the present disclosure is short in time and has lower equipment requirements; specifically, low-oxygen titanium powder in an approximately spherical shape suitable for 3D printing or injection molding can be obtained from titanium powder in irregular shapes simply by adjusting the gas flow rate and grinding gas pressure so that the particles of the powder frictionate and collide with each other. Thus, low-cost and short-process batch production can be realized.

Embodiment 2

In this embodiment, the irregular hydride-dehydride titanium powder described in the embodiment 1 is used, the oxygen content is 1,200 PPM, the mass is 600 g, and the particle size is 325 meshes. The included angle between the nozzles of the fluidized bed jet mill and the wall of the grinding chamber is 60°, nitrogen is used as the grinding gas, the grinding gas pressure is 0.6 MPa, the frequency of the classifier wheel is 60 Hz during material feeding and 0 Hz during material discharging, and the grinding time is 4 min. The obtained titanium powder is approximately spherical, with smooth surface, 41 s/50 g fluidity and 1,600 PPM oxygen content.

Embodiment 3

In this embodiment, the hydride-dehydride titanium powder described in the embodiment 1 is used, the oxygen content is 1,200 PPM, the mass is 600 g, and the particle size is 200 meshes. The included angle between the nozzles of the fluidized bed jet mill and the wall of the grinding chamber is 60°, nitrogen is used as the grinding gas, the grinding gas pressure is 0.45 MPa, the frequency of the classifier wheel is 50 Hz, and the grinding time is 6 min. The obtained titanium powder is approximately spherical, with 33 s/50 g fluidity and 1,600 PPM oxygen content.

Embodiment 4

In this embodiment, the hydride-dehydride titanium powder described in the embodiment 1 is used, the oxygen content is 1,200 PPM, the mass is 400 g, and the particle size is 325 meshes. The included angle between the nozzles of the fluidized bed jet mill and the wall of the grinding chamber is 60°, argon is used as the grinding gas, the grinding gas pressure is 0.45 MPa, the frequency of the classifier wheel is 60 Hz, and the grinding time is 4 min. The obtained titanium powder has 39 s/50 g fluidity and 1,700 PPM oxygen content.

Embodiment 5

In this embodiment, irregular hydride-dehydride titanium powder with 1,600 PPM oxygen content is used, the mass is 600 g, the particle size of 500 meshes, the included angle between the nozzles of the fluidized bed jet mill and the wall of the grinding chamber is 90°, argon is used as the grinding gas, the grinding gas pressure is 0.72 MPa, the frequency of the classifier wheel is 60 Hz, and the grinding time is 6 min. The obtained titanium powder has 35 s/50 g fluidity and 2,000 PPM oxygen content. The results obtained in the above embodiments prove that the method of preparation of titanium and titanium alloy powder for 3D printing based on a fluidized-bed jet milling technique in the present disclosure has a short process, high powder yield, high production efficiency and low cost, and can meet the requirements of 3D printing, injection molding and other processes in terms of fluidity, impurity content, particle size distribution and other properties.

While the present disclosure is described above by means of embodiments exemplarily, the present disclosure is not limited to those embodiments. All other variants made to the disclosed embodiments with reference to the description of the present disclosure shall be deemed as falling in the scope defined by the claims of the present disclosure.

The invention claimed is:
1. A method of preparation of a powder for 3D printing, comprising:
   1): obtain a raw material powder comprising titanium, 1,000-2,000 PPM oxygen, and a particle size of 200-800 meshes, wherein the raw material powder has an irregular morphology;
   2): loading the raw material powder into a jet mill having a fluidized bed jet grinding chamber, three gas inlets each having a nozzle arranged inside the jet mill above the fluidized bed jet grinding chamber at 60-90° included angle between the nozzle and a wall surface of the grinding chamber, and a powder inlet and a powder outlet arranged at a lower end and a upper end of the fluidized bed jet grinding chamber, respectively, and a classifier wheel disposed inside the jet mill and connected to the powder outlet;
   3): injecting a grinding gas into the grinding chamber through the three gas inlets, at a pressure of 0.1-10 MPa, grinding the raw material powder for 2 to 60 mins; and discharging the powder for 3D printing, wherein the classifier wheel is operated at a frequency of 0 to 60 Hz,
   wherein the raw material powder is a titanium alloy powder, a hydride-dehydride titanium powder, or a mixture thereof, and
   the grinding gas is argon or nitrogen.

2. The method according to claim 1, wherein the three nozzles of the three gas inlets form a 120° included angle with each other.

3. The method according to claim 1, wherein each gas inlet is at a negative pressure, and the powder outlet is shielded by nitrogen or argon.

4. The method according to claim 1, wherein the frequency of the classifier wheel is 60 Hz during loading of the raw material powder and is 0 Hz during discharging of the powder for 3D printing.

* * * * *